(12) United States Patent
deVries

(10) Patent No.: US 6,571,883 B2
(45) Date of Patent: Jun. 3, 2003

(54) SOD HARVESTER

(75) Inventor: Roelof H. deVries, Dalton, OH (US)

(73) Assignee: Steiner Turf Equipment, Inc., Dalton, OH (US)

( * ) Notice: Subject to any disclaimer, the term of this patent is extended or adjusted under 35 U.S.C. 154(b) by 0 days.

(21) Appl. No.: 09/873,900

(22) Filed: Jun. 4, 2001

(65) Prior Publication Data

US 2002/0179308 A1 Dec. 5, 2002

(51) Int. Cl.[7] .............................................. A01B 45/04
(52) U.S. Cl. ........................ 172/19; 171/124; 171/138
(58) Field of Search .............................. 172/19, 20, 35; 171/91, 92, 101, 110, 111, 124, 125, 134, 138; 56/16.4 R, 228, 200

(56) References Cited

U.S. PATENT DOCUMENTS

| | | | |
|---|---|---|---|
| 3,540,535 A | 11/1970 | Brouwer et al. | 172/20 |
| 3,651,702 A * | 3/1972 | Speiser | 74/203 |
| 3,807,504 A | 4/1974 | Nunes, Jr. | 172/20 |
| 4,621,696 A | 11/1986 | Brouwer | 172/20 |
| 4,892,152 A | 1/1990 | van Vuuren | 172/20 |
| 5,628,170 A * | 5/1997 | Vargas | 56/16.4 R |
| 6,112,825 A | 9/2000 | Hutchison | 172/19 |

* cited by examiner

Primary Examiner—Christopher J. Novosad
(74) Attorney, Agent, or Firm—Harness, Dickey & Pierce, P.L.C.

(57) ABSTRACT

An improved method of mounting the cutting head of a sod harvester with respect to the conveyor employs a single ball joint between the cutting head and the conveyor, and a pair of side links spaced outwardly of the conveyor and arranged to constrain the cutting head against lateral displacement with respect to the conveyor. Preferably, the links are adjustable in length to permit vertical and lateral adjustment of the cutting head with respect to the conveyor, e.g. "tracking" of the cutting head.

6 Claims, 9 Drawing Sheets

SOD HARVESTER

FIELD OF THE INVENTION

This invention relates generally to sod harvesters.

BACKGROUND OF THE INVENTION

Sod harvesters have been commercially available for a long time, and usually are designed as self-propelled machines or as a cutting unit which can be attached to a conventional tractor. In either case, the harvester has a cutting head which includes (a) a generally-horizontal knife to undercut the sod at a specified depth, (b) side cutting blades or coulters to cut the edges of the sod strip, and (c) a roller to support the weight of the cutting head and to establish the thickness of the sod strip. Cut strips of sod are delivered onto a conveyor which conveys the strips rearwardly and upwardly away from the cutting head, for collection.

Sod harvesters have used a variety of methods to follow the contour of the ground; in general, the objective is to allow the operator to cut a thin strip of sod without the risk of scalping, or cutting too thinly on occasion. Some harvesters, commonly referred to as "conventional" or "fixed head" harvesters, have the cutting head rigidly connected to the conveyor frame. Examples of this type of harvester are the harvester described in U.S. Pat. No. 3,540,535, the Brouwer model 1555, and the Kesmac model 2100. These harvesters include a pivoting "ball joint" connection at the rear of the conveyor, which allows the cutting head to rise and fall with undulations in the direction of motion of the harvester. A "track rod" connects the cutting head or conveyor to the tractor with pivoting ball joints and holds the cutting head parallel to the direction of motion. These pivot joints also allow the conveyor and cutting head frame to rock from side to side to follow undulations perpendicular to the direction of motion of the harvester. The axis about which the conveyor and cutter assembly rotates is defined by the location of the centres of the rear pivot point and the track rod connection to the cutting head or conveyor. Since this axis is not horizontal, the cutting knives turn away from being exactly perpendicular to the direction of travel when the head pivots, resulting in damage to the edges of the sod strip.

This problem is addressed by harvesters that are commonly referred to as "floating head", or "pivoting head", harvesters, which have a pivoting connection between the cutting head frame and the conveyor frame. U.S. Pat. Nos. 4,621,696, 3,807,504, and 4,892,152 disclose harvesters of this type, in which the cutting head can tilt about a horizontal pivot axis. The cutting knives and roller no longer pivot front-to-back. However, since the axis of tilt lies at some distance above ground level, the cutting head can be induced to pivot by a side load on the knives and roller, such as would happen if sod is being cut on a curve, as is common with center-pivot irrigation sod cultivation. This can result in scalping.

One attempt to solve the floating head problem is disclosed in U.S. Pat. No. 6,112,825. This patent describes a floating head design in which the pivoting connection between the cutting head and the conveyor is angled, such that the pivot axis intersects the knife. It should be noted, however, that a side load on the knives and roller can induce the whole assembly to pivot on an axis defined by the front and rear support ball joints, causing scalping.

SUMMARY OF THE INVENTION

An object of the present invention is to provide improvements intended to address the problems of prior art sod harvesters. In particular, the invention provides an improved manner of mounting the cutting head to the conveyor to control uniformity in the thickness of sod strips being harvested.

The sod harvester of the invention includes a drive unit for moving the harvester in a forward direction, a cutting head for cutting a strip of sod from the ground as the harvester moves in said forward direction, and conveyor means disposed rearwardly of the cutting head for receiving cut strips of sod from the cutting head and conveying the strips rearwardly for collection. The invention provides means for connecting the conveyor and the cutting head, comprising a ball joint disposed on a longitudinal centre line of the cutting head and a pair of laterally spaced links, each connected at one end to the conveyor means and at the opposite end to the cutting head at respective connection points that are selected to constrain the cutting head laterally with respect to the conveyor means, while permitting lateral tilting of the cutting head about the ball joint to accommodate lateral unevenness in the ground.

In other words, the invention provides an improved means of connecting the cutting head and the conveyor to allow free flotation of the ground-following roller and cutting knives, with substantially reduced scalping and damage to edges of the sod strip.

Preferably, the conveyor is pivotally mounted so that its leading end can move up and down to follow ground contours, but is constrained from side to side movement, as in most floating head harvesters. The ball joint is located below the conveyor and behind the cutting head, and the two links are to the outside of the conveyor, located at a distance vertically from the ball joint. The links constrain the cutting head to remain perpendicular to the direction of travel, while at the same time allowing it to rock from side to side in response to changes in ground contour.

This mounting arrangement does not create a discrete axis about which the cutting heat pivots in relation to the conveyor frame. A notional pivot axis can be defined as an axis that intersects the center ball joint, is oriented in the direction of travel, and is angled downward at the same angle as the two links in their centre positions (cutting head horizontal). The actual rocking of the cutting head will deviate from this notional axis to the extent that the ends of the links connected to the cutting head frame deviate from a plane normal to the notional axis as the cutting head rocks. With the notional axis oriented to approximately the bottom of the ground-following roller, substantially less "induced pivoting" is experienced relative to prior floating heads.

An advantage of the preferred embodiment of the invention over a single pivot shaft between the cutting head frame and the conveyor frame is that it permits greater ground clearance.

A further advantage is that adjustable links provide a means of adjusting the vertical distance between the back of a "sod guide" that is usually provided at the rear of the cutting head to the leading end of the conveyor. As the links are shortened, the sod guide moves up relative to the conveyor. This relationship is important to the smooth and gentle transfer of sod from the cutting blade to the conveyor. Prior art sod harvesters have no way of adjusting that relationship without changing the depth of cut.

BRIEF DESCRIPTION OF DRAWINGS

In order that the invention may be more clearly understood, reference will now be made to the accompanying drawings which illustrate a particular preferred embodiments of the invention by way of example, in contrast with the prior art.

In the drawings.

All of the views show a sod harvester in the form of a cutting unit which is designed to be attached to a conventional tractor. The tractor itself is not shown in detail but typically is disposed to the left of the cutting unit in the direction of travel of the harvester, as indicated in ghost outline at T in FIG. 7. The tractor itself and the manner in which the cutting unit is coupled to the tractor are not part of the present invention. Reference may be made to the prior patents cited herein to illustrate mounting of the cutting unit to a tractor. The disclosures of those patents are incorporated herein by reference.

DESCRIPTION OF THE PRIOR ART

Figures 1, 1A:
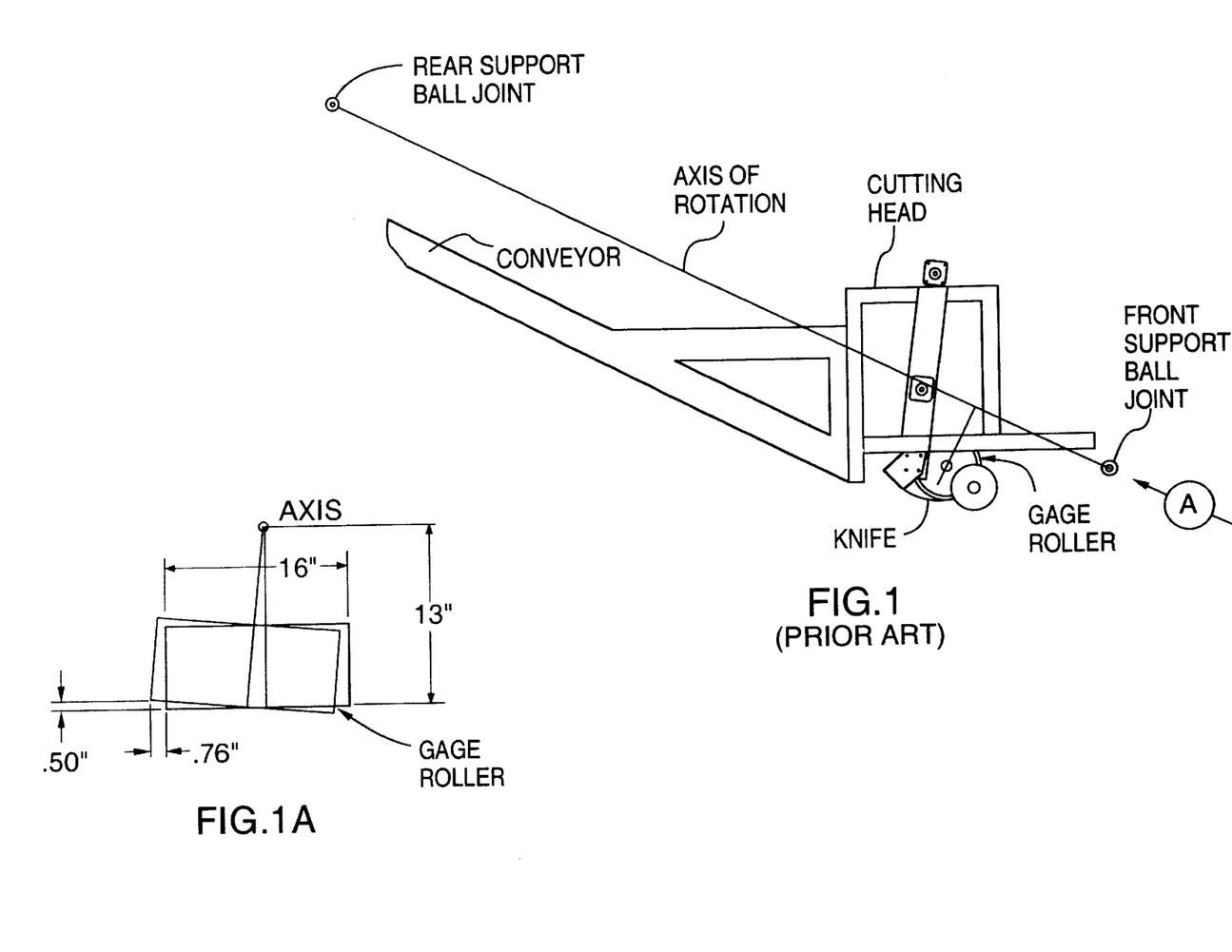
FIG. 1 is a schematic side elevational view of one form of prior art sod harvester.
FIG. 1a is an end elevational view in the direction of arrow A in FIG. 1.
Figures 2, 2A:
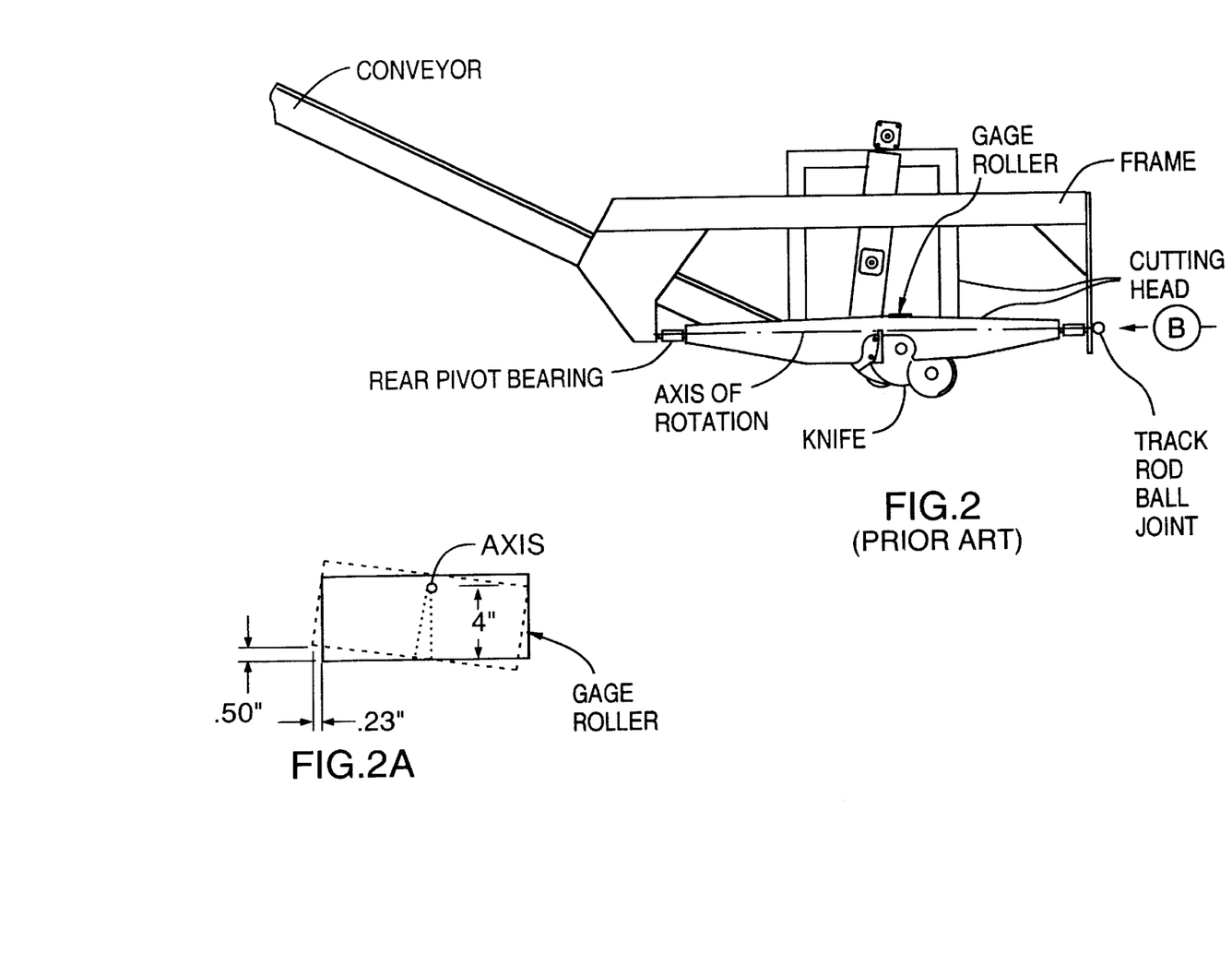
FIG. 2 is a view similar to FIG. 1 illustrating a second form of prior art sod harvester.
FIG. 2a is a view generally in the direction of B in FIG. 2.
Figures 3, 3A, 3B:
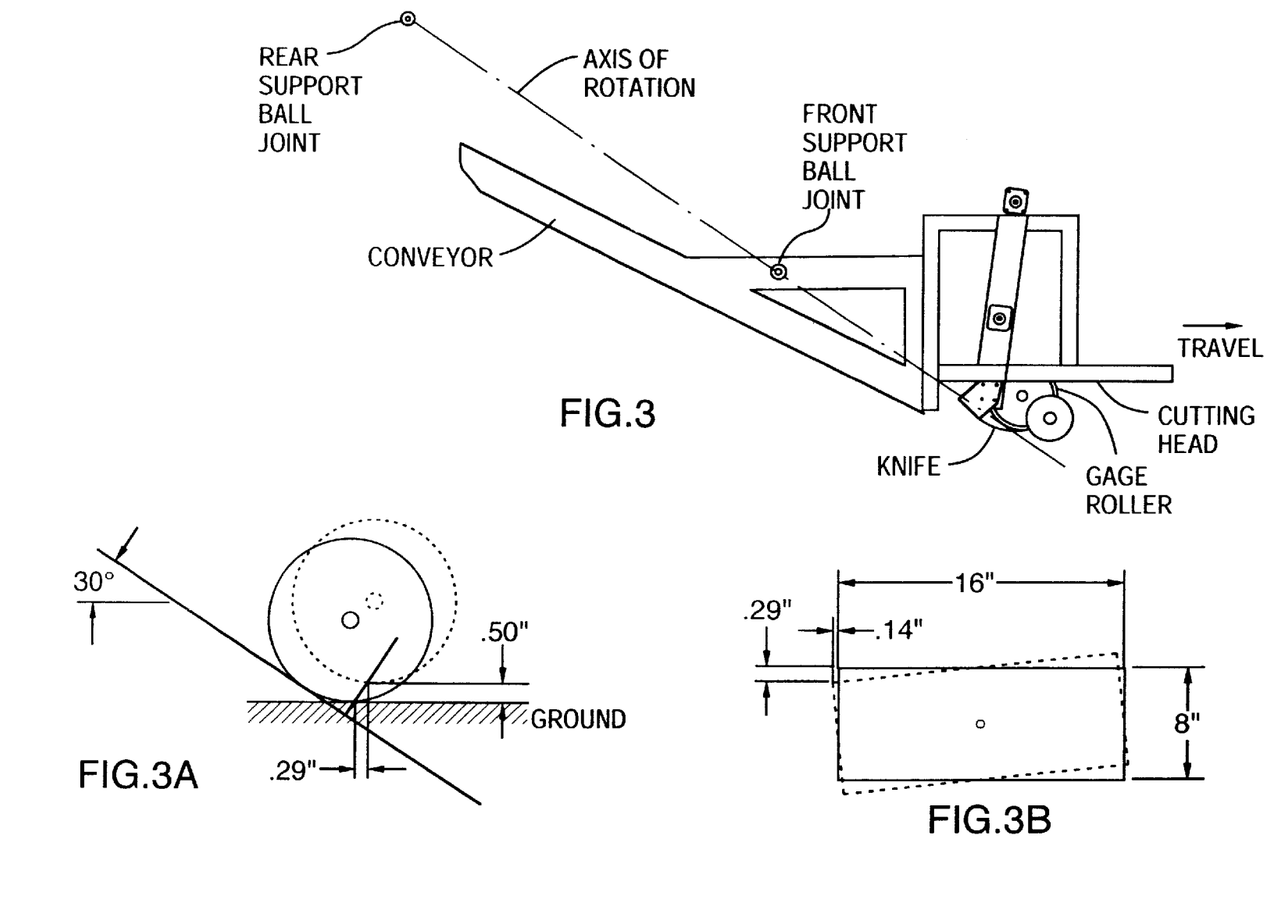
FIG. 3 is a view similar to FIGS. 1 and 2 illustrating a third form of prior art sod harvester.
FIG. 3a is an enlarged view of the gage roller of FIG. 3.
FIG. 3b is a plan view of the gage roller in FIG. 3.

FIGS. 1 to 3 show three types of prior art sod harvesters which are compared with the present invention. For the purpose of comparison, all of the harvesters are assumed to have a gage roller which is an 8" in diameter by 16" wide and which tilts up 0.50 inches on the outside edge. While the actual dimension of displacement sideways will vary with geometry, using a consistent assumption will illustrate the different results inherent in the designs.

FIG. 1 illustrates a fixed head harvester, known commercially as the Brouwer 1555, Brouwer 1550, Brouwer 1500, Brouwer A3A, Texas conventional, among others. The axis of rotation is defined by the rear and front support ball joints, and it falls significantly above the gage roller, in this case 13 inches. From FIG. 1a, it can be seen that a 0.50 inch vertical rise requires a 0.76 inch horizontal displacement.

FIG. 2 illustrates a common fixed head design, the Brouwer 1560. The characteristic of an independent cutting head with a horizontal pivot axis relatively low to the ground is also found in U.S. Pat. Nos. 4,621,696 and 4,892,152. In this case, the horizontal displacement around the axis of rotation to accommodate a 0.50 inch rise is reduced to 0.23 inches (FIG. 2a).

FIG. 3 illustrates a fixed head design known as the Kesmac 2100. In this design, the cutter head is rigidly attached to the conveyor, as in FIG. 1, but the axis of rotation is arranged to intersect the ground close to the gage roller, which eliminates the side shift problem of FIGS. 1 and 2. However, since the pivot axis is at a significant angle relative to horizontal (conservatively assumed to be 30 degrees), the 0.50 inch rise causes the end of the roller to move forward 0.29 inches. As seen FIG. 3b, this results in the roller wobbling off square by 0.14 inches.

DESCRIPTION OF PREFERRED EMBODIMENT

Figure 4:
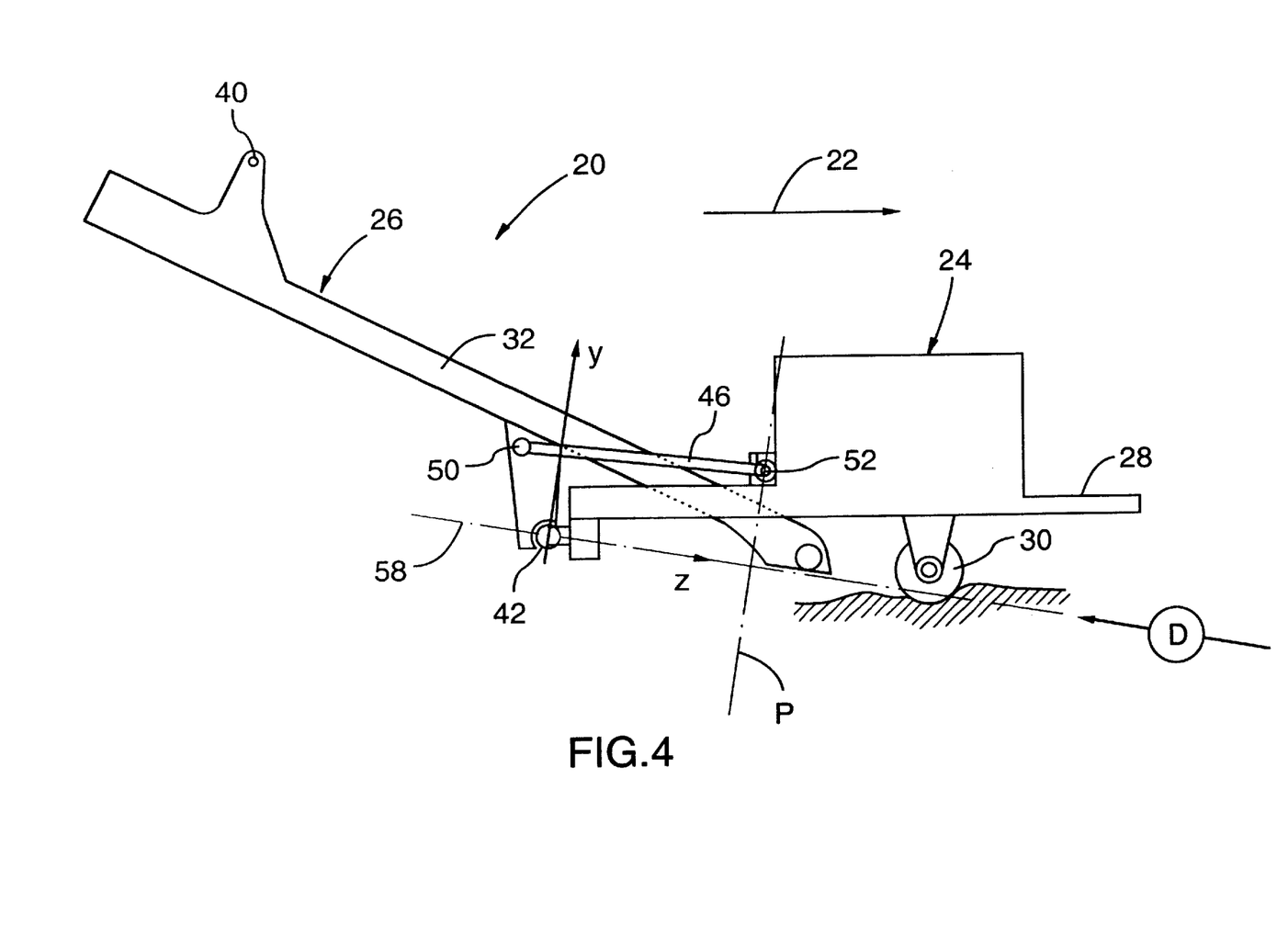
FIG. 4 is a side elevational view similar to FIGS. 1, 2 and 3 but illustrating a sod harvester in accordance with a preferred embodiment of the present invention.
Figure 9:
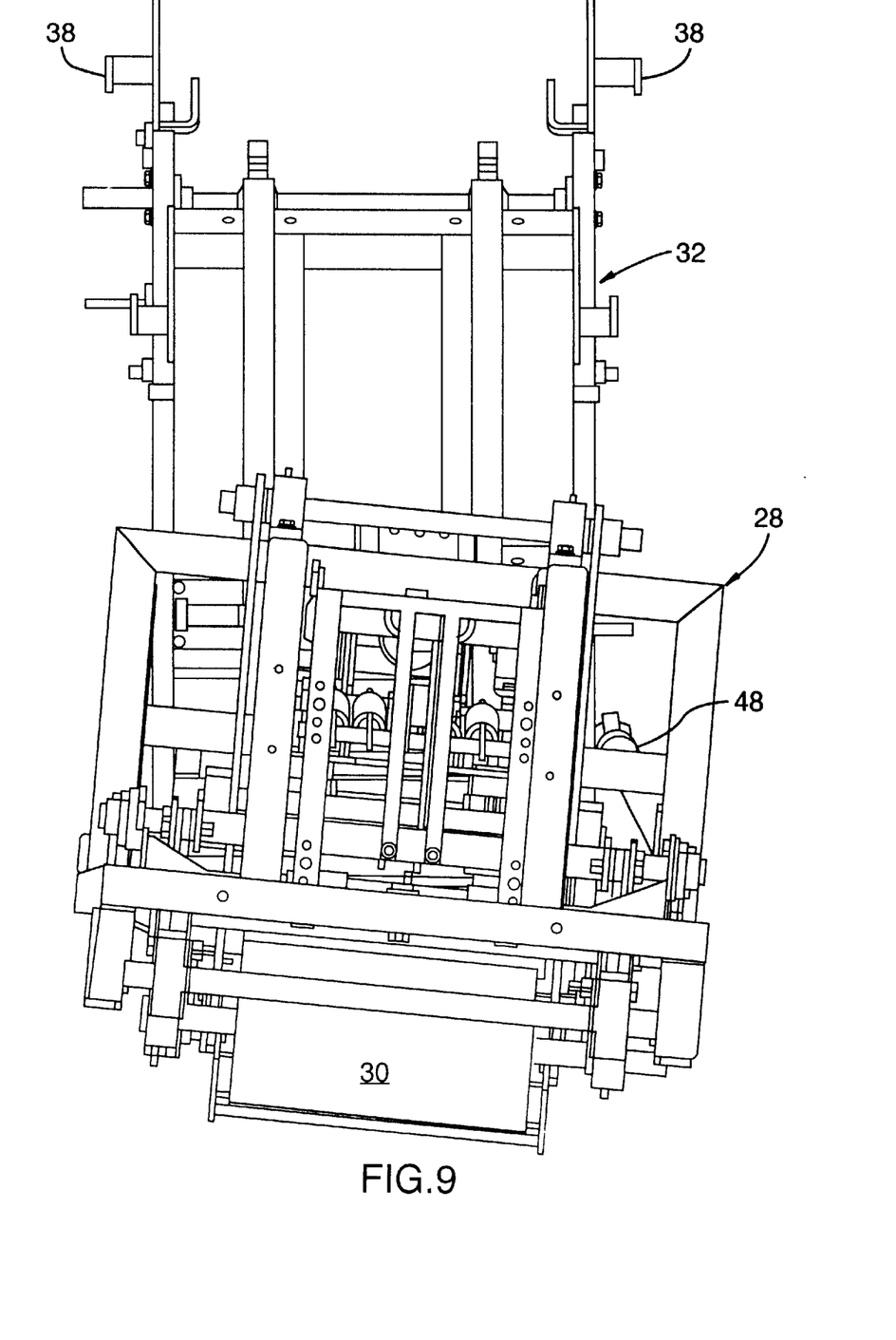
FIG. 9 is a view similar to FIG. 8 showing the cutting head of the harvester in a tilted position; and, FIG. 10 is a perspective view of a practical example of the sod harvester as seen from the right and above in FIG. 4.
Figure 10:
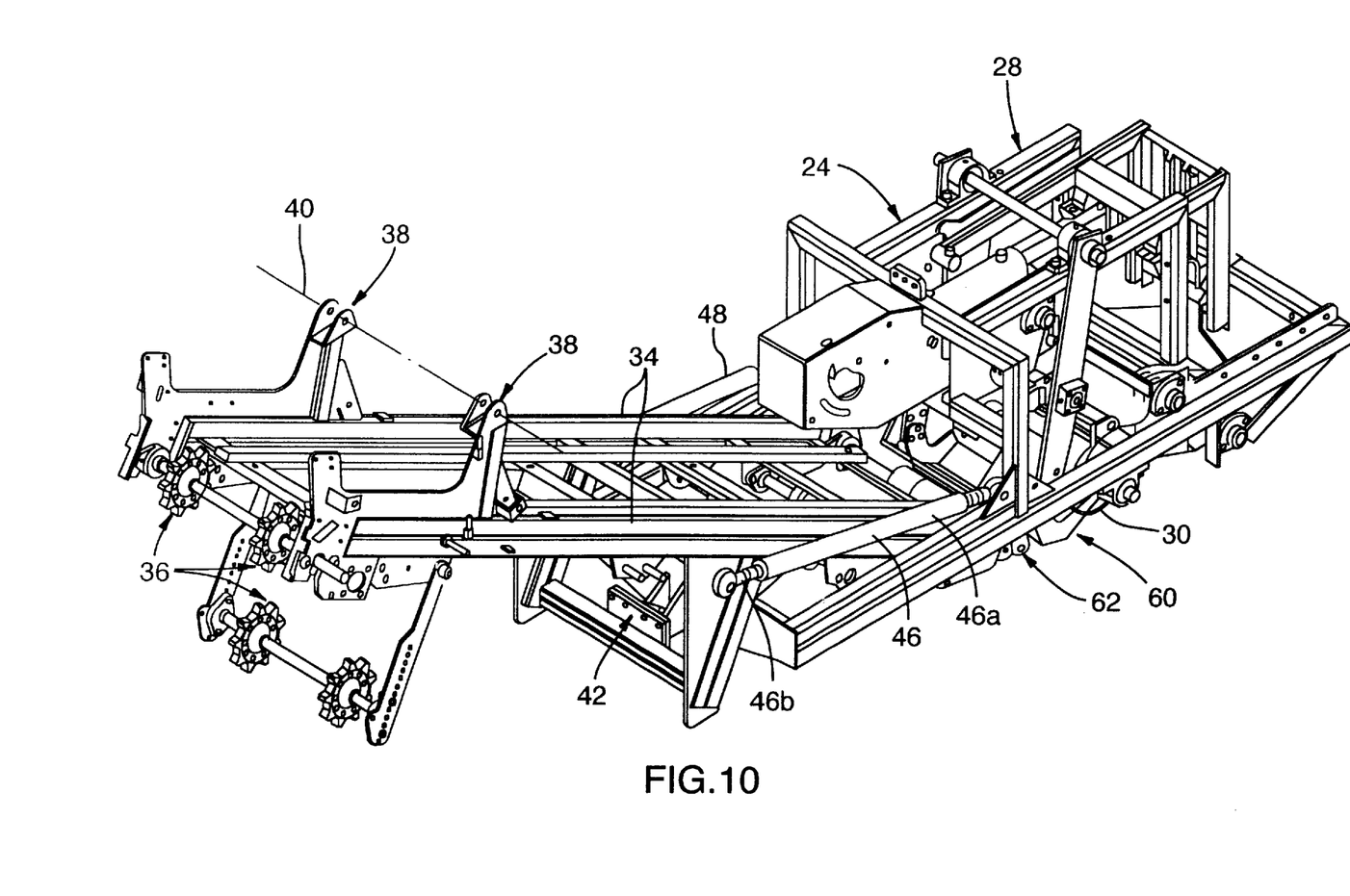

Reference will now be made to FIGS. 4 to 10 in describing particular preferred embodiments of the invention by way of example. For purposes of comparison with the prior art, FIG. 4 is a schematic side elevational view similar to FIGS. 1 to 3. Later views such as FIGS. 7 to 10, provide more detail; FIGS. 9 and 10 in particular illustrate a practical form of sod harvester in accordance with the invention.

Referring initially to FIG. 4, the sod harvester of the invention is generally indicated by reference numeral 20 and is designed to be mounted alongside a drive unit such as a tractor ("T" in FIG. 7) for movement in a forward direction indicated by arrow 22. The harvester includes a cutting head 24 for cutting a strip of sod as the harvester moves in the forward direction 22, and conveyor means generally indicated at 26 disposed rearwardly of the cutting head for receiving cut strips of sod from the cutting head and conveying the strips rearwardly and upwardly for collection. The cutting head 24 and the conveyor means 26 may be of known design and therefore are not illustrated in detail. The invention resides in the provision of means for connecting the conveyor and the cutting head, as will be described. For present purposes, it is sufficient to note that the cutting head 24 includes a cutting head frame 28, and a gage roller 30 which is mounted below the frame 28. Roller 30 partially supports the weight of the cutting head and follows the contour of the ground as the harvester moves in the direction of travel 22. FIG. 4 does not show the undercutting knife or the side blades that are typically provided in association with the gage roller 30, since these components and their relationship with the gage roller are conventional.

The conveyor means 26 includes a conveyor frame 32 which essentially comprises a pair of side frame members 34 (FIG. 10) between which a conveyor belt is supported for conveying cut strips of sod upwardly and rearwardly away from the cutting head. In FIG. 10, the belt itself is not shown but reference numeral 36 indicates sprockets around which the belt travels. A pair of brackets 38 project upwardly from the conveyor side frame members 34 and define a transverse pivot axis 40 (see FIG. 4) at which the conveyor frame is coupled to the drive unit so that the conveyor can pivot up and down to follow ground contours. Side-to-side tilting motion of the conveyor frame is not provided for.

Figure 7:
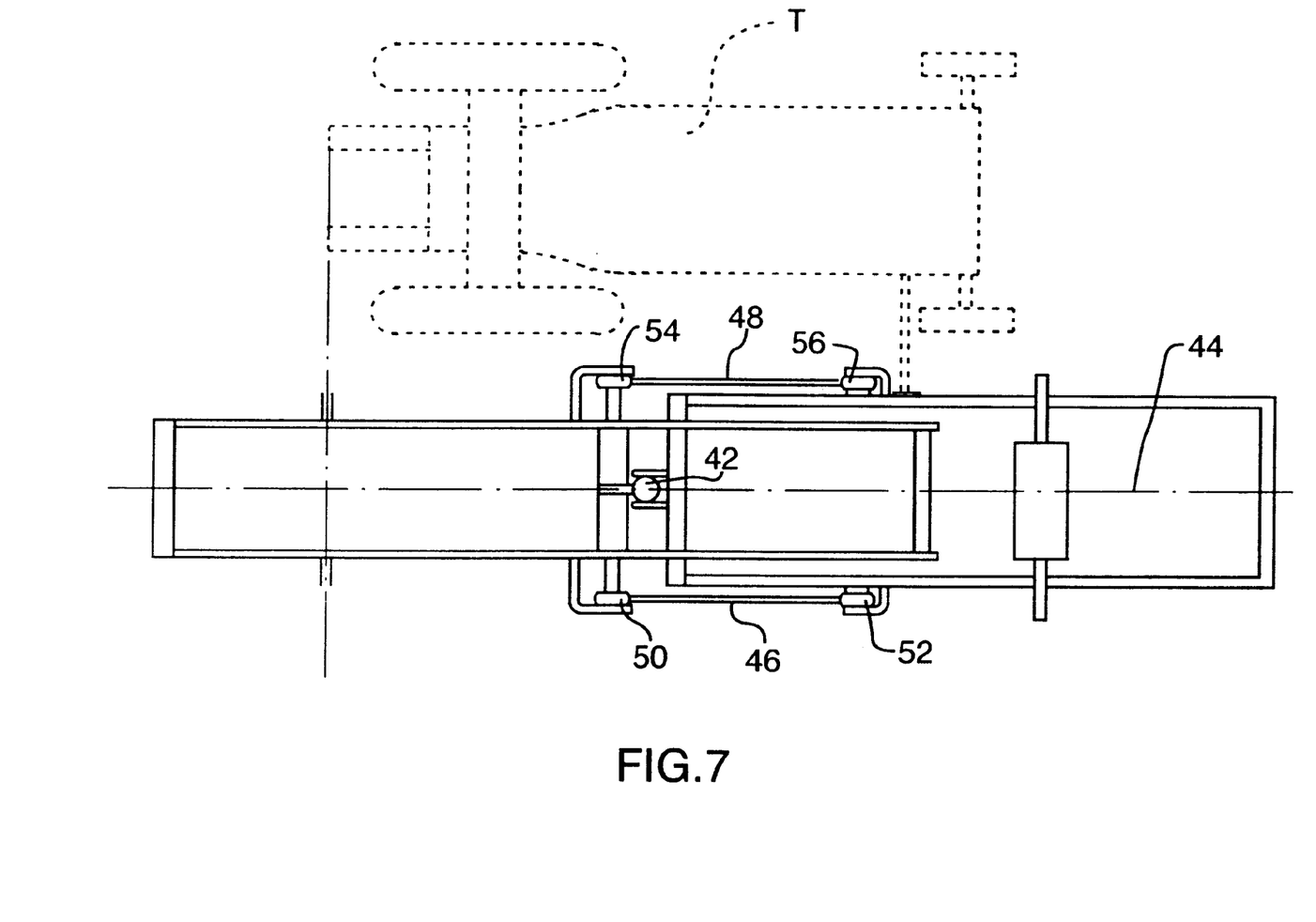
FIGS. 7 and 8 are plan and front elevational views corresponding to FIG. 4.
Figure 8:
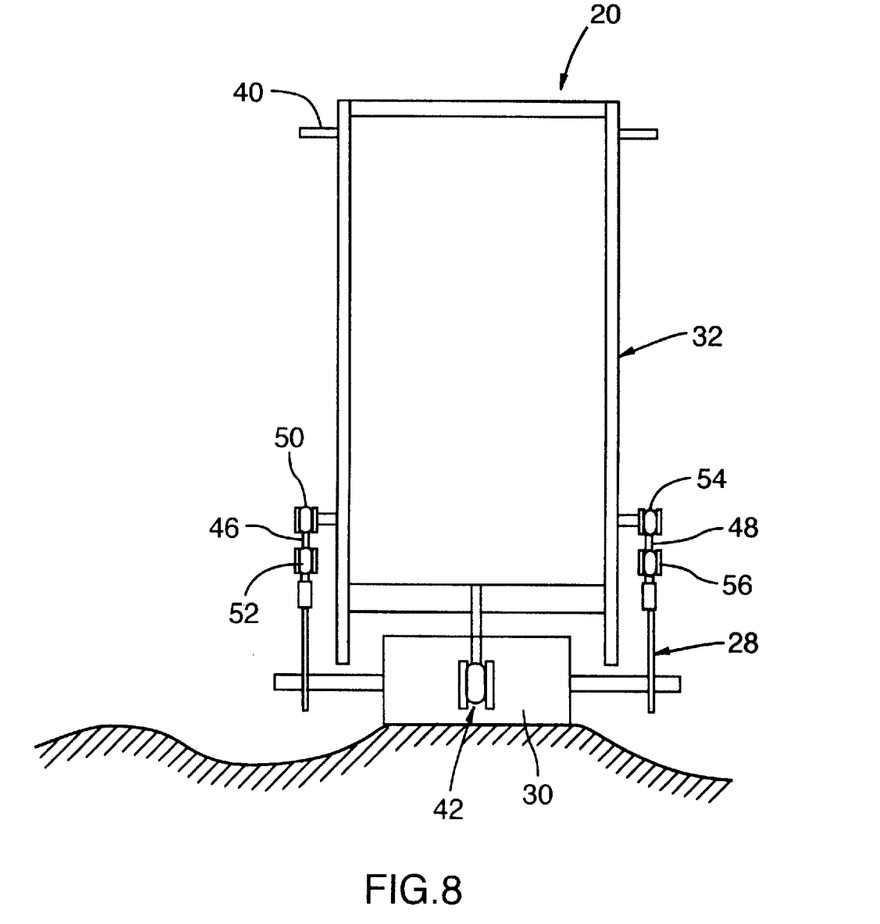

In accordance with the present invention, connecting means are provided between the conveyor frame 32 and the cutting head frame 28, and comprise a spherical ball joint 42 that is disposed on a longitudinal centre line of the cutting head (denoted 44 in FIG. 7), and a pair of laterally spaced links 46, 48 disposed outwardly of the respective frames 28 and 32 (see FIG. 7). Each of the links 46, 48 is connected at one end to the conveyor frame and at its opposite end to the cutting head frame. The two connection points for link 46 are denoted 50 and 52, and the corresponding connection points for link 48 are denoted 54 and 56. The connection points are selected to constrain the cutting head 24 laterally with respect to the conveyor means while permitting lateral tilting of the cutting head about the ball joint 42 to accommodate lateral unevenness in the ground.

FIG. 4 shows the relationship between the ball joint 42, the link 46 and its pivot points 50 and 52. When the cutting head 24 is on a horizontal surface, the corresponding link 48 and connection points 54 and 56 at the opposite side of the harvester are in the same position as link 46 and its connection points 50 and 52. Each of the connection points 50, 52, 54 and 56 is provided by a ball joint.

The centre-line ball joint 42 constrains all points on the cutting head to remain at a constance distance from the ball joint. The two links 46 and 48 connect the conveyor frame 32 to the cutting head frame 28 at a distance vertically from ball joint 42. These links hold the cutting head frame 28 in the desired position relative to the conveyor means 26 and the direction of travel 22.

Figure 5:
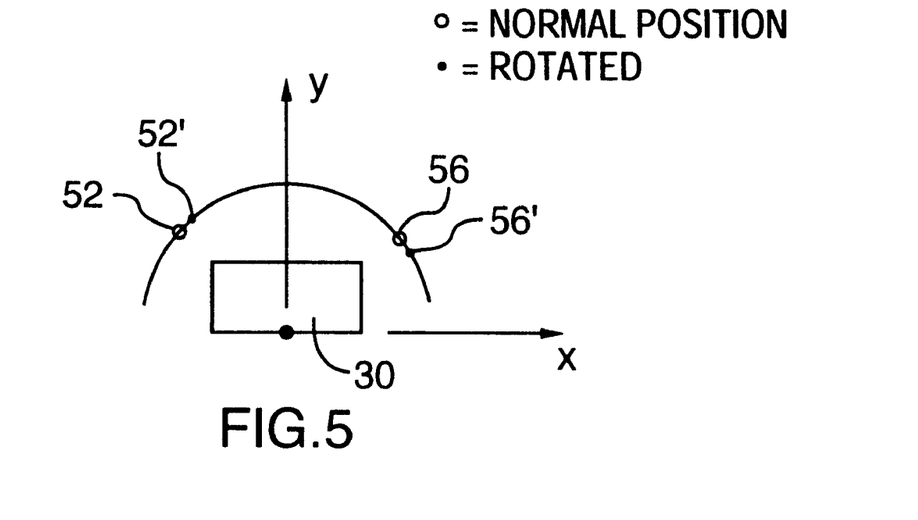
FIG. 5 is an elevational view in the direction of arrow D in FIG. 4.

The rocking action of the head 24 and the optimal orientation of the links 46, 48 can be best understood by imagining a notional pivot axis 58 located by the center of ball joint 42 and the center of the contact line between the gage roller 30 and the ground. A co-ordinate system can be assigned with the z direction pointing down that notional axis 58, with the y direction normal to z on a vertical plane, and the x direction horizontal, normal to z, as shown in FIGS. 4 and 5. In order for the cutting head frame to actually pivot about the notional axis, ball joints 52 and 56 would need to travel on the circle formed by the intersection of a plane P normal to the z direction with a sphere centered on ball joint 42 with radius equal to the distance from ball joint 42 to ball joints 52 and 56. This circle is shown on FIG. 5, with 52' and 56' being the ball joints 52 and 56 in the rotated position. Since the ball joints 52 and 56 are at the end of links 46 and 48, they are constrained to maintain a constant distance from ball joints 50 and 54, and therefore will leave that plane P as the head rocks, by some distance in the negative z direction. However, it will be appreciated that the closest approximation to the condition of the cutting head rotating about the notional axis would exist if the links 46 and 48 were perpendicular to the plane P when the cutting head is in the horizontal position. In that case, the negative z distance by which ball joints 52 and 56 leave plane P is minimized. Also, links 46 and 48 should be as long as practical, in order to minimize the deviation from plane P.

Links 46 and 48 being perpendicular to plane P is also important because that causes the distance by which the ball joint leaves plane P to be the same for ball joint 52 as for ball joint 56. If one point moved further in the negative z direction than the other, the cutting head would experience rotation about the y axis, which is undesirable because the cutting head would no longer be parallel to the direction of travel.

Figure 6:
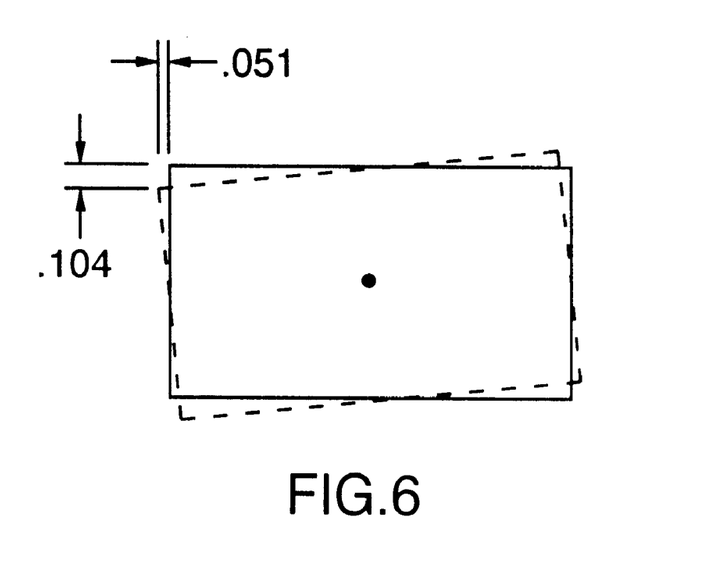
FIG. 6 is a plan view of the gage roller in FIG. 4.

In order to compare this design with prior art, analysis of side shift and wobble was done with a CAD model rather than simple calculations, since there is no pivoting about an axis. For the same 0.50 rise on one side of the roller, horizontal displacement was 0.09 inches, and the wobble off square was 0.051 inches, as shown in FIG. 6. This wobble, or "yaw" can be explained by the fact that the notional axis is not exactly horizontal.

In summary, the motion of the cutting head 24 includes a minor "yaw" component that is significantly less than what has been calculated for prior art designs. Additionally, as can most clearly be seen from FIG. 4, ground clearance behind the cutter head is substantially improved as compared with prior art arrangements in which a pivot shaft is provided in the area to the left of the ball joint 42 along axis 58. That whole area can now remain unobstructed.

In any of the inventive embodiments, the side links 46 and 48 preferably are adjustable in length so as to permit adjustment of tracking of the cutting head 24 relative to the conveyor frame 32. The links can also be adjusted to vary the vertical distance between the sod guide (not shown) that is typically provided on the cutting head 24, and the conveyor 32 to assure smooth and gentle transfer of sod from the cutting head to the conveyor.

As noted previously, FIG. 10 shows a practical example of a sod harvester in accordance with the preferred embodiment of the invention. FIG. 10 will not be described in detail since the principal components are well known and not part of the invention. The invention resides in the connecting means between the conveyor frame 32 and the cutting head frame 28, namely the ball joint 42 and the links 46 and 48. Those components have been indicated in FIG. 10, as has the gage roller 30 and an associated cutter blade assembly, which is generally denoted 60. Precise constructional details of the cutting head frame and the conveyor frame will not be described and may vary. A connection point for a track rod connection to the tractor is provided at the opposite side of the cutting head frame 28 from that seen in FIG. 10 in a position corresponding to the point that is denoted 62.

Each of the links 46, 48 has an end fitting that is screw-threaded into the main body of the link so that the length of the link can be adjusted. In FIG. 10, the main body of link 46 is denoted 46a and the screw-in end fitting is denoted 46b. In this embodiment, the link would of course have to be disconnected from the frame in order to effect adjustment. Fitting 46b would be screwed into or out of the main body 46a and then the link re-connected. The construction of link 48 is essentially the same.

It will of course be appreciated that the preceding description relates to a particular preferred embodiment of the invention and that many modifications are possible within the broad scope of the invention. Some of those modifications have been indicated previously and others will be apparent to a person skilled in the art.

In particular, it is to be understood that the sod harvester of the invention may be powered other than by a tractor; the harvester may be self-propelled, i.e. have a built-in drive unit.

I claim:

1. A sod harvester comprising a drive unit for moving the harvester in a forward direction; a cutting head for cutting a strip of sod from the ground as the harvester moves in said forward direction; conveyor means disposed rearwardly of the cutting head for receiving cut strips of sod from the cutting head and conveying the strips rearwardly for collection; and means connecting the conveyor and the cutting head, comprising a ball joint disposed on a longitudinal centre line of the cutting head and a pair of laterally spaced links, each connected at one end to the conveyor means and at an opposite end to the cutting head at respective connection points that are selected to constrain the cutting head laterally with respect to the conveyor means while permitting lateral tilting of the cutting head about the ball joint to accommodate lateral unevenness in the ground.

2. A sod harvester as claimed in claim 1, wherein the cutter head includes a gage roller that makes line contact with a ground surface over which the sod harvester moves, wherein each of the said pair of laterally spaced links is disposed approximately parallel to a line connecting the centre of the ball joint and the centre of a line of contact between the surface of the roller and the ground.

3. A sod harvester as claimed in claim 1, wherein each of said links is adjustable in length to permit lateral and vertical adjustment of the cutting head with respect to the conveyor means.

4. A sod harvester as claimed in claim 1, wherein the cutting head includes a cutting head frame and the conveyor means includes a conveyor frame, and wherein the said pair of links connect the two frames and are disposed laterally outwardly of said conveyor frame.

5. A sod harvester as claimed in claim 4, wherein each said link in said pair of links is provided at each end with a ball joint by which the link is connected to the respective cutting head frame and conveyor frame.

6. In a sod harvester that includes a cutting head for cutting a strip of sod from the ground as the harvester moves in a forward direction, and conveyor means disposed rearwardly of the cutting head for receiving cut strips of sod from the cutting head and conveying the strips rearwardly for collection; the improvement comprising: a ball joint disposed on a longitudinal centre-line of the cutting head and connecting the cutting head and conveyor means, and a pair of laterally spaced links, each connected at one end to the conveyor means and at an opposite end to the cutting head at respective connection points that are selected to constrain the cutting head laterally with respect to the conveyor means while permitting lateral tilting of the cutting head about the ball joint to accommodate lateral unevenness in the ground.

* * * * *